United States Patent
Burkhardt et al.

(10) Patent No.: US 7,155,713 B1
(45) Date of Patent: Dec. 26, 2006

(54) COMPONENTIZED OPERATING SYSTEM

(75) Inventors: Ryan Burkhardt, Redmond, WA (US); Tom G. Yaryan, Seattle, WA (US); Seetharaman Harikrishnnan, Redmond, WA (US); Donald J. McNamara, Woodinville, WA (US); David J. D'Souza, Mercer Island, WA (US); Seung-Yup Chai, Redmond, WA (US); Sanjay Shenoy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/561,389

(22) Filed: Apr. 27, 2000

(51) Int. Cl.
G06F 9/445 (2006.01)

(52) U.S. Cl. .................................... 717/175

(58) Field of Classification Search ........ 717/162–178; 709/200–203, 213–216, 246, 319, 327–329, 709/400, 19; 707/10
See application file for complete search history.

(56) References Cited

U.S. PATENT DOCUMENTS

| | | | | |
|---|---|---|---|---|
| 4,916,637 A | * | 4/1990 | Allen et al. ................. 706/11 |
| 5,590,001 A | | 12/1996 | Ino et al. |
| 5,794,052 A | * | 8/1998 | Harding ....................... 717/178 |
| 5,878,408 A | * | 3/1999 | Van Huben et al. ............ 707/1 |
| 5,963,743 A | * | 10/1999 | Amberg et al. .............. 717/174 |
| 5,974,572 A | | 10/1999 | Weinberg et al. |
| 6,038,399 A | * | 3/2000 | Fisher et al. ................ 717/178 |
| 6,066,182 A | * | 5/2000 | Wilde et al. ................. 717/175 |
| 6,080,207 A | * | 6/2000 | Kroening et al. ............ 717/172 |
| 6,092,189 A | * | 7/2000 | Fisher et al. .................... 713/1 |
| 6,144,992 A | * | 11/2000 | Turpin et al. ............... 709/208 |
| 6,157,928 A | | 12/2000 | Sprenger et al. |
| 6,161,051 A | * | 12/2000 | Hafemann et al. ............ 700/86 |
| 6,182,275 B1 | * | 1/2001 | Beelitz et al. ............... 717/175 |
| 6,247,128 B1 | * | 6/2001 | Fisher et al. ................. 713/100 |
| 6,292,941 B1 | * | 9/2001 | Jollands ....................... 717/176 |
| 6,351,850 B1 | * | 2/2002 | van Gilluwe et al. ........ 717/175 |
| 6,442,754 B1 | * | 8/2002 | Curtis .......................... 717/175 |
| 6,446,260 B1 | * | 9/2002 | Wilde et al. ................. 717/173 |
| 6,487,723 B1 | * | 11/2002 | MacInnis ..................... 725/132 |
| 2001/0029605 A1 | * | 10/2001 | Forbes et al. .................. 717/11 |

OTHER PUBLICATIONS

Microsoft Press Computer Dictionary Third Edition; 1997; 3 pages.
Microsoft Press; Microsoft Press Computer Dictionary, Third Edition; p. 51;1997.
"Trademark Electronic Search System (Tess) from the USPTO database" for "Windows" trademark of Microsoft filed in USPTO Aug. 20, 1999; http://tess2.uspto.gov/bin/gate.exe?f=doc &state=n00gan.5.26.
"The JX Operating System" Michael Golm, Meik Feiser Christian Wawersich, and Juergen Kleinoeder 2002 USENIX Annual Technical Conference, Jun. 10-15, 2002, Monterey, CA, pp. 45-58.
Pike, et al., "Plan 9 from Bell Labs".
Pike, et al, "The Use of Name Spaces in Plan 9", Operating Systems Review, vol. 27, #2, Apr. 1993, pp. 72-76.

* cited by examiner

Primary Examiner—Kakali Chaki
Assistant Examiner—Tuan Anh Vu
(74) Attorney, Agent, or Firm—Lee & Hayes, PLLC (57) ABSTRACT

A componentized operating system is separated into multiple different components. In certain embodiments, a bill of materials (BOM) identifies at least one component that is installed (or is to be installed) for an operating system image on a computer. Each component includes one or more files and has a corresponding manifest that identifies which other components (if any) the component is dependent on. During an installation or upgrading process, the manifest for a component can be accessed to determine which additional components (if any) are to be installed even if they are not explicitly identified in the BOM.

7 Claims, 8 Drawing Sheets

COMPONENTIZED OPERATING SYSTEM

TECHNICAL FIELD

This invention relates to operating systems, and more particularly to a componentized operating system.

BACKGROUND OF THE INVENTION

Conventional computers generally execute an operating system to manage various aspects of the computer as it is running. Typically, the operating system is responsible for managing access to storage devices as well as input and/or output devices, and controlling the execution of one or more additional applications. Before the operating system can be executed by the computer, it typically must be installed on the computer, a process which usually involves copying multiple files from a distribution medium (e.g., a CD ROM) onto a storage device (e.g., a hard disk) of the computer.

A typical operating system includes a large number of files (currently numbering into the thousands), which can include instructions and/or data. These instructions, when executed by the computer, provide the operating system functionality. With the large number of files also comes a large number of dependencies among files. For example, in order for their intended functionality to be carried out, many files require the installation of one or more other files. Although such dependencies are often known by the manufacturer of the operating system at the time of installation, it can be difficult for a user, administrator, or other software developer to learn about these dependencies. Not knowing about such dependencies can prove troublesome, as software developers may not know what data or instructions in other files affect the particular file(s) they are concerned with, an administrator or user troubleshooting a malfunctioning computer may not know what files are applicable to the problem, etc.

These problems are only exacerbated by post-installation modifications to the operating system. An operating system can be modified in any of a wide variety of manners, such as by adding or replacing one or more particular files, by any of a wide variety of people (e.g., a user, administrator, software developer other than the operating system developer, etc.). When such modifications occur, it increases the difficulty of identifying dependencies among files existing on the computer. Furthermore, it becomes even more difficult to troubleshoot a malfunctioning computer or update the operating system because it is difficult for the user or administrator to know exactly what functionality is (or should be) installed on the computer.

In some systems, the operating system installation and/or updating process(es) display to the user an interface that illustrates the operating system in terms of its functionality (e.g., accessories, games, dial-up networking, etc.). Such interfaces, however, are merely that—user interfaces. Although they provide the user with the ability to select groups of files of the operating system to be installed based on functionality, the operating system itself is still a large collection of files that is not itself componentized and which does not typically identify dependencies among any groups of files.

The componentized operating system described below addresses these and other disadvantages.

SUMMARY OF THE INVENTION

A componentized operating system is described herein. In certain embodiments, the operating system is separated into multiple different components, each including one or more files, and dependencies among these components are maintained.

According to one aspect, a bill of materials (BOM) identifies at least one component that is installed (or is to be installed) for an operating system image. Each component also has a corresponding manifest that identifies which other components (if any) the component is dependent on. Thus, during an installation or upgrading process, the manifest for a component can be accessed to determine which additional components (if any) are to be installed even if they are not explicitly identified in the BOM.

According to another aspect, an operating system is upgraded based on the current BOM for the operating system and an update BOM indicating what the updated operating system should be. Any differences (e.g., additional components that are needed or components that are no longer needed) are determined by comparing the current BOM to the update BOM. The updating process uses these differences to modify the operating system (deleting and/or adding components), and then uses the update BOM as the new current BOM for the operating system.

According to another aspect, the components (and thus functionality) of an operating system, as well as the current versions of components, can be identified by accessing the BOM corresponding to the operating system. The BOM maintains the record of at least some of the components included in the operating system, so the information is readily available. Additionally, a check of manifests corresponding to the components in the BOM can also be made to identify additional components that are part of the operating system image but not listed in the BOM.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented using one or more application specific integrated circuits (ASICs).

Figure 1:
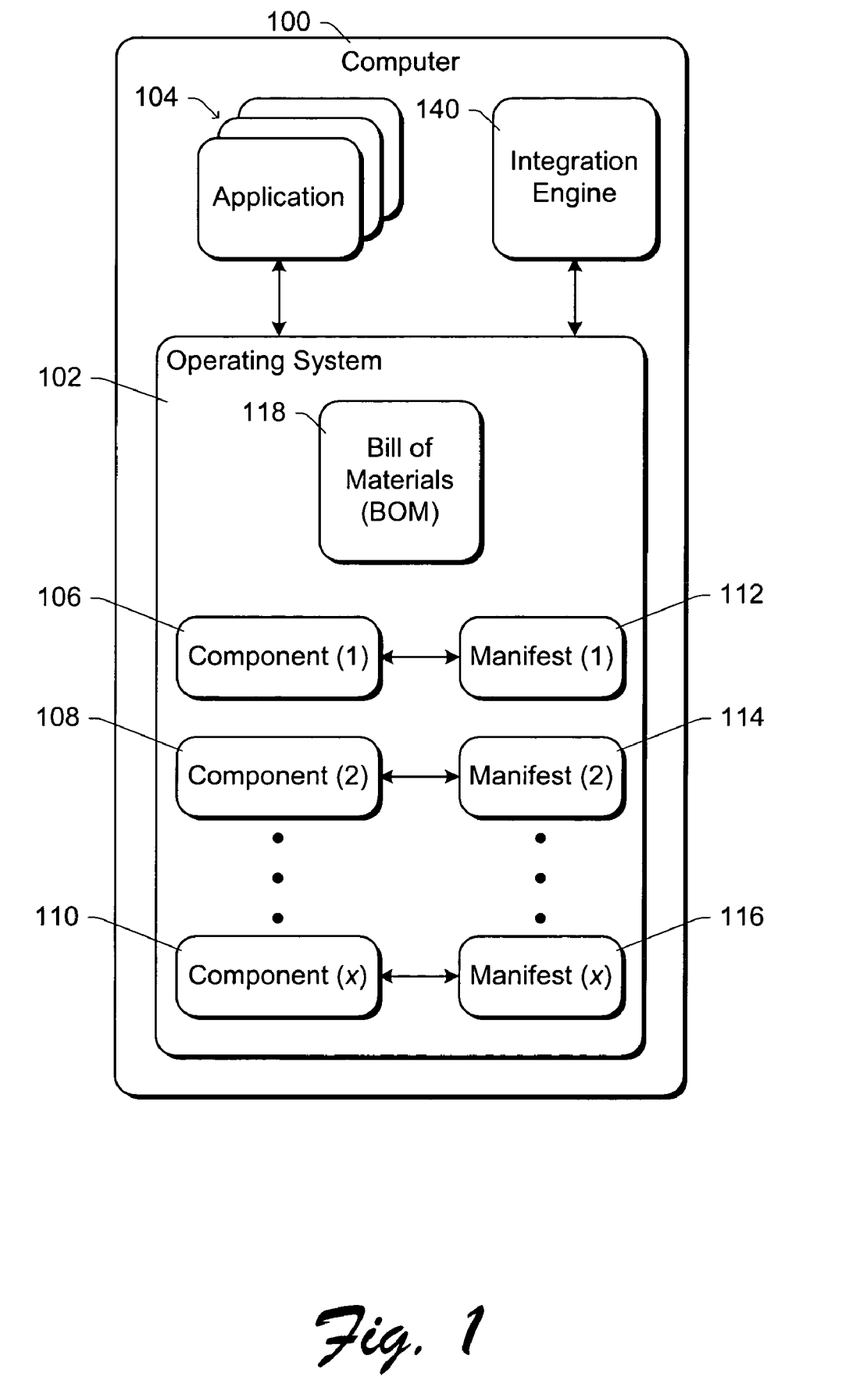
FIG. 1 is a block diagram illustrating an exemplary computer system in accordance with certain embodiments of the invention.

FIG. 1 is a block diagram illustrating an exemplary computer system in accordance with certain embodiments of the invention. A computer system 100 is illustrated including an operating system 102 and one or more application programs 104.

Operating system 102 is the fundamental software control program for computer 100, performing various functions including providing a user interface, managing the execution of one or more applications 104, and controlling the input of data from and output of data to various input/output (I/O) devices. Application programs 104 represent one or more of a wide variety of software application programs that can be executed on computer 100. Examples of such application programs include educational programs, reference programs, productivity programs (e.g., word processors, spreadsheets, databases), recreational programs, utility programs (e.g., communications programs), etc. Application programs 104 may be installed on computer 100 by the user, or alternatively pre-installed by the manufacturer and/or distributor of computer 100.

Operating system 102 includes multiple (x) components 106, 108, and 110, each of which has a corresponding manifest 112, 114, and 116, respectively, and a bill of materials (BOM) 118. The operating system functionality is separated into multiple different components 106–110. As used herein, a component refers to a collection of one or more files (or file identifiers). The files can include software instructions (e.g., an executable file, a dynamically linked list (DLL), a component object module (COM), etc.) or data for use by one or more of the components 106–110. In one implementation, the files (instructions and/or data) corresponding to particular functionality of the operating system are grouped together in the same component. For example, there may be a games component, a communications component, a file system component, etc. The grouping of files that result in the componentization can be static or alternatively can change over time. For example, updates to operating system 102 may result in selected files from certain components being removed and added to other components.

Each manifest 112–116 includes information describing the corresponding component. Any of a wide variety of metadata regarding the corresponding component can be included in each manifest 112–116. In one implementation, the manifest identifies the version of the corresponding component as well as which other components, if any, the corresponding component is dependent on. By way of example, in order for one or more files in component 106 to properly execute, one or more other files (e.g., a DLL file) from component 108 may need to be installed on computer 100. In this example, manifest 112 would indicate that component 106 depends on component 108.

Figure 2:
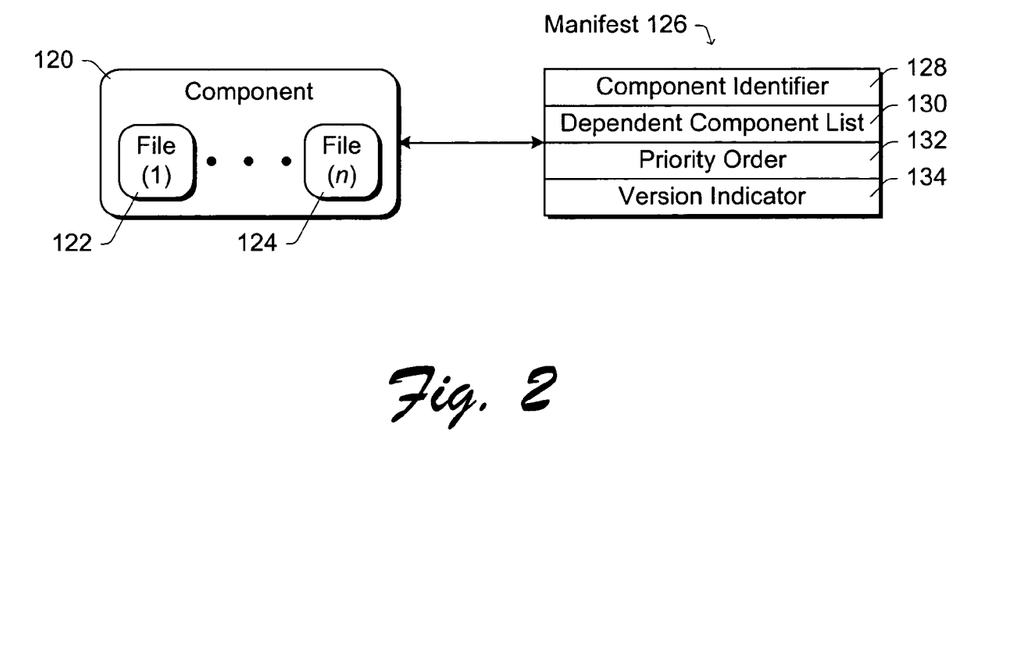
FIG. 2 illustrates an exemplary component and corresponding manifest in accordance with certain embodiments of the invention.

FIG. 2 illustrates an exemplary component and corresponding manifest in accordance with certain embodiments of the invention. A component 120 includes at least one file 122 and may optionally include more than one (n) files 124. Although illustrated as files in FIG. 2, component 120 may alternatively include pointers or other identifiers of one or more of files 122, 124 rather than the actual files.

Component 120 corresponds to manifest 126. In the illustrated example, manifest 126 includes a component identifier 128 identifying component 120 (e.g., by name or some other unique identifier). This correspondence can alternatively be maintained in different manners, such as inclusion of an identifier (not shown) of manifest 126 in component 120, storage of both component 120 and manifest 126 (or identifiers thereof) in a data structure that maintains an inherent correspondence between component 120 and manifests 126, etc.

Manifest 126 also includes a dependent component list 130 that identifies zero or more components that component 120 is dependent on. The identified dependent components are those components which also need to be installed as part of the operating system image in order for component 120 to function properly. In the illustrated example, identifiers 128 identify components that are necessary for component 120 to function properly, but alternatively may include components which should be included (i.e., components that component 120 prefers to have as part of the operating system but which are not necessary).

Manifest 126 further includes a priority order 132 and a version indicator 134. Priority order 132 identifies an ordering for component 120 during installation (or upgrading) of the operating system image. This ordering can be used during installation and/or upgrading to identify when, relative to other components, the component should be integrated into the operating system. The operating system developer is aware of what order components should be integrated with respect to one another, and thus can readily include an ordering in manifest 126. Version indicator 134 identifies the version of component 120.

Alternatively, some or all of the information maintained in manifest 126 may be maintained in different locations. By way of example, some or all of the information may be incorporated into component 120 or BOM 118 of FIG. 1.

Returning to FIG. 1, BOM 118 identifies one or more components which are (or are to be) installed on computer 100 as the operating system image. Different computers can include different operating system images that are based on the same operating system. For example, different Original Equipment Manufacturers (OEMS) may customize the same operating system in different ways (e.g., so that the operating system boots with an initial screen identifying the OEM, different default settings may be used, etc.), different functionality may be included, etc. Thus, many different components may be part of the operating system of which only a subset, identified by BOM 118, are actually installed on a particular computer as an operating system image.

Figure 3:
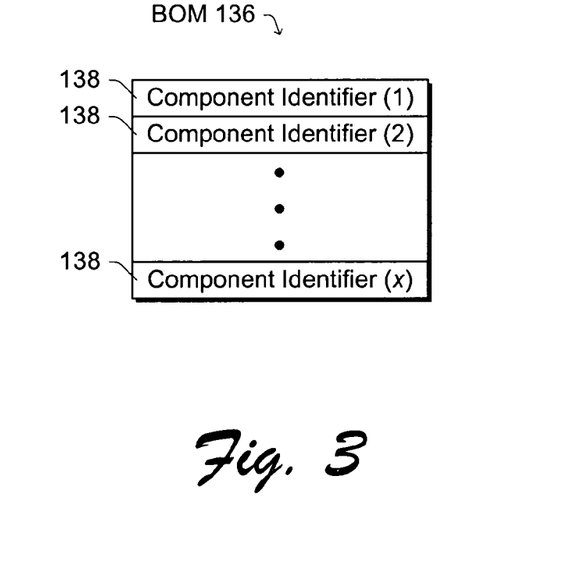
FIG. 3 illustrates an exemplary bill of materials in accordance with certain embodiments of the invention.

FIG. 3 illustrates an exemplary bill of materials in accordance with certain embodiments of the invention. BOM 136 (e.g., which can be BOM 118 of FIG. 1) includes an identifier 138 of at least one of the components in the operating system image (e.g., components 106–110 of FIG. 1). Any of a wide variety of identifiers can be used, such as alphanumerics, ideographic characters, etc. BOM 136 may identify each of the components directly, or alternatively indirectly (e.g., by identifying their corresponding manifests, such as manifests 112–116 of FIG. 1).

Although BOM 136 is illustrated as a single entity, BOM 136 can alternatively be separated into multiple pieces (e.g., with component identifiers 138 separated into two or more of these pieces). These multiple pieces, when combined, would provide the functionality of the single BOM 136.

Returning to FIG. 1, computer 100 further includes an integration engine 140. Integration engine 140 manages the installation of the operating system image onto computer 100 and also manages any subsequent updating of the operating system image. Integration engine 140 uses BOM 118 in the installation of operating system 102 to identify components that are to be installed on computer 100.

The component(s) identified by BOM 118 may be a complete list or only a partial list. For example, component 106 may depend on component 108 (with such dependence being indicated in manifest 112). BOM 118 may list both component 106 and component 108, or alternatively may list only component 106 and rely on integration engine 140 to access manifest 112 and determine that component 108 is also to be installed. Thus, BOM 118 can explicitly identify components that are part of the operating system image (by listing them), and/or implicitly identify components that are part of the operating system image (by listing components that depend on them, or components that depend on components that depend on them, etc.)

BOM 118 can also be used after an operating system image is installed on computer 100. By way of example, an application 104 may access BOM 118 to determine whether any components that are necessary for it to execute are included in components 106–110. If not, then an update program (e.g., an application 104 or a component 106–110 of operating system 102) can optionally be accessed to upgrade operating system 102 to include the necessary components. By way of another example, an application 104 may access BOM 118 to determine which versions of components are included in the operating system 102 and whether there are more recent versions available elsewhere that could be used to update operating system 102.

Another example of the manner in which BOM 118 can be used is a user-specific upgrading process. For instance, a user may indicate during upgrading that he or she prefers only certain components (e.g., selection of a "minimum" install option). However, BOM 118 can be accessed to determine that the user previously had additional components installed in the previous version of the operating system, and can install those components for the new version even though they are in addition to those requested by the user.

Figure 4:
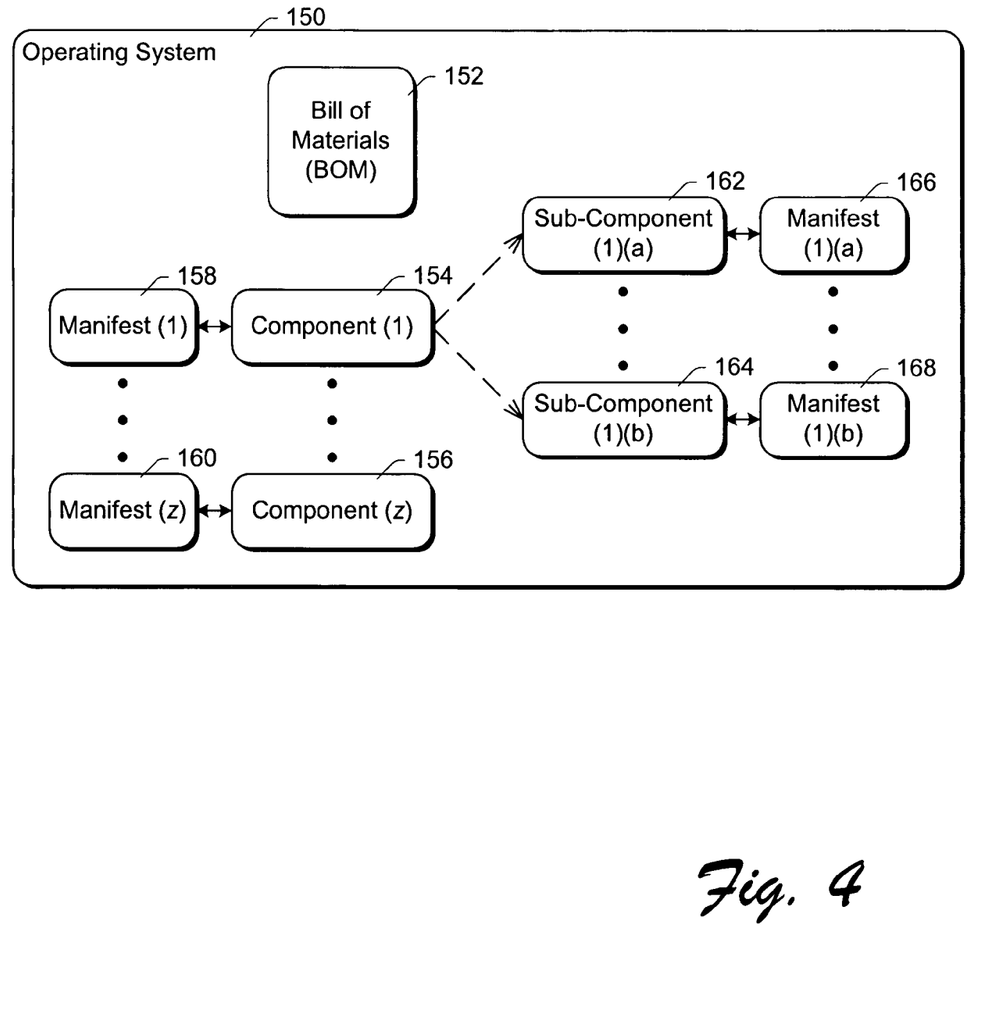
FIG. 4 is a block diagram illustrating another exemplary componentized operating system in accordance with certain embodiments of the invention.

FIG. 4 is a block diagram illustrating another exemplary componentized operating system in accordance with certain embodiments of the invention. An operating system 150 is illustrated including a BOM 152 and multiple (z) components 154 and 156, and corresponding manifests 158 and 160, respectively.

Component 154 is made up of multiple sub-components 162 and 164, each having a corresponding manifest 166 and 168, respectively. Component 154 may include additional files or alternatively all files that make up component 154 may be included in sub-components 162 and 164. Manifests 166 and 168 include identifiers of sub-components 162 and 164, dependent component lists, priority orders, and version indicators, analogous to those maintained by manifest 126 of FIG. 2. Alternatively, such information can be included in sub-components 162 and 164, manifests 158 and 160, components 154 and 156, and/or BOM 152.

As illustrated in FIG. 2, the componentization of operating system 150 can be hierarchical. Each component can be separated into one or more sub-components. Additionally, each sub-component can further be separated into more sub-sub-components (not shown). This sub-componentization can be repeated through any number of levels or hierarchical layers of sub-components.

Separating components into sub-components allows groups of files to be managed at a finer granularity. By way of example, a bug fix to an operating system may require installation of a newer version of one specific file. If this one file were one file of ten (each approximately 10 k bytes) in sub-component 162 of operating system 150 but one file of fifty (each approximately 10 k bytes) in component 106 of FIG. 1, then it would be quicker to upgrade sub-component 162 (only ten files) than it would be to update component 106 (fifty files).

Figure 5:
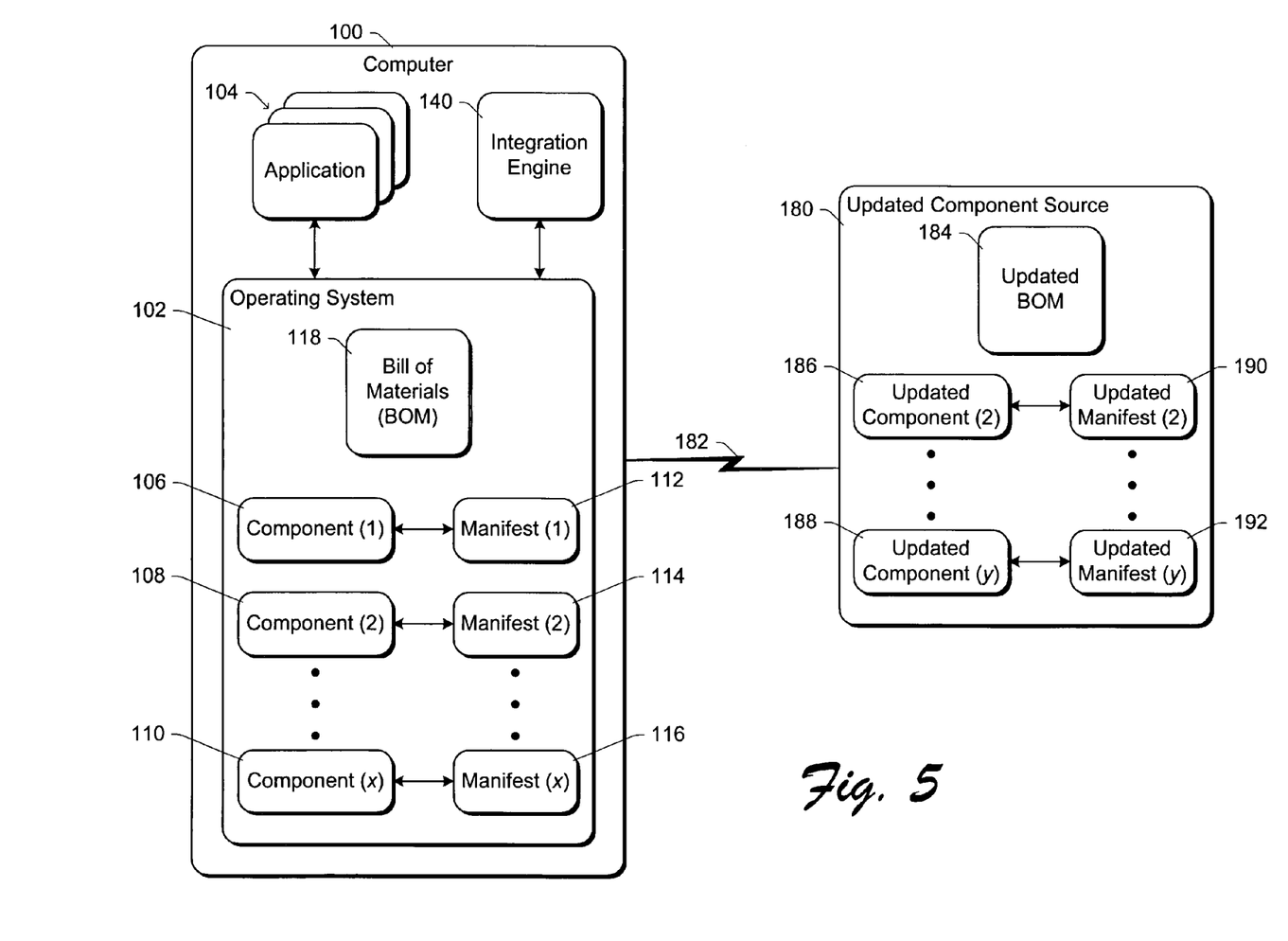
FIG. 5 is a block diagram exemplifying how a componentized operating system can be updated in accordance with certain embodiments of the invention.

FIG. 5 is a block diagram exemplifying how a componentized operating system can be updated in accordance with certain embodiments of the invention. A computer 100, as discussed above with reference to FIG. 1, is illustrated including a componentized operating system 102. A component source 180 is coupled to computer 100 via coupling 182. Component source 180 can be any of a variety of sources, such as a magnetic or optical disk, Flash memory or solid state disk, etc. Additionally, component source 180 can be local (e.g., a disk that is accessed by a disk drive of computer 100) or remote (e.g., a disk at a remote server accessed over a network). The exact nature of coupling 182 is dependent on the nature of component source 180 (e.g., coupling 182 may be a bus or busses connecting a disk drive to computer 100, a modem and telephone line, a network adapter and network, a combination of any of these, etc.).

Updated component source 180 includes an updated BOM 184, and multiple (y) updated components 186, 188 and corresponding manifests 190, 192, respectively. Although BOM 184, components 186, 188, and manifests 190, 192 are illustrated together at a single source 180, alternatively any one or more of BOM 184, components 186, 188, and manifests 190, 192 may be stored at different locations (either remote or local to computer 100).

Updated BOM 184 identifies the components 186, 188 that are updates for operating system 102 as well as the versions of components 186, 188. During an update process, assuming that the new components 186, 188 have not already been installed as one of components 106–110, the updated components 186, 188 and corresponding manifests 190, 192 replace the corresponding components 106–110. By way of example, assume that component 186 is a newer version of component 108. In this situation, component 186 and manifest 190 would replace component 108 and manifest 114, respectively, in operating system 102. Component 186 can replace component 108 by simply having the files in component 108 overwritten by the files in updated component 186 (the overwritten files may optionally be saved elsewhere before being overwritten). In addition to replacing components and manifests, during the update process BOM 118 is modified to identify the new versions of the components rather than the previous versions.

The operating system can be updated for any of a wide variety of reasons. By way of example, bug fixes to certain files of certain components may be available, new functionality (e.g., replacement or additional files) in a component may be available, new components may be available, etc.

Additionally, a new component may be installed as part of the operating system along side a previous component rather than replacing it. If the previous component is explicitly identified in BOM 118, then BOM 118 is modified to indicate that it includes both the new and previous versions of the component. This allows different applications to use whichever version of the component they prefer (or are programmed to use).

Figure 6:
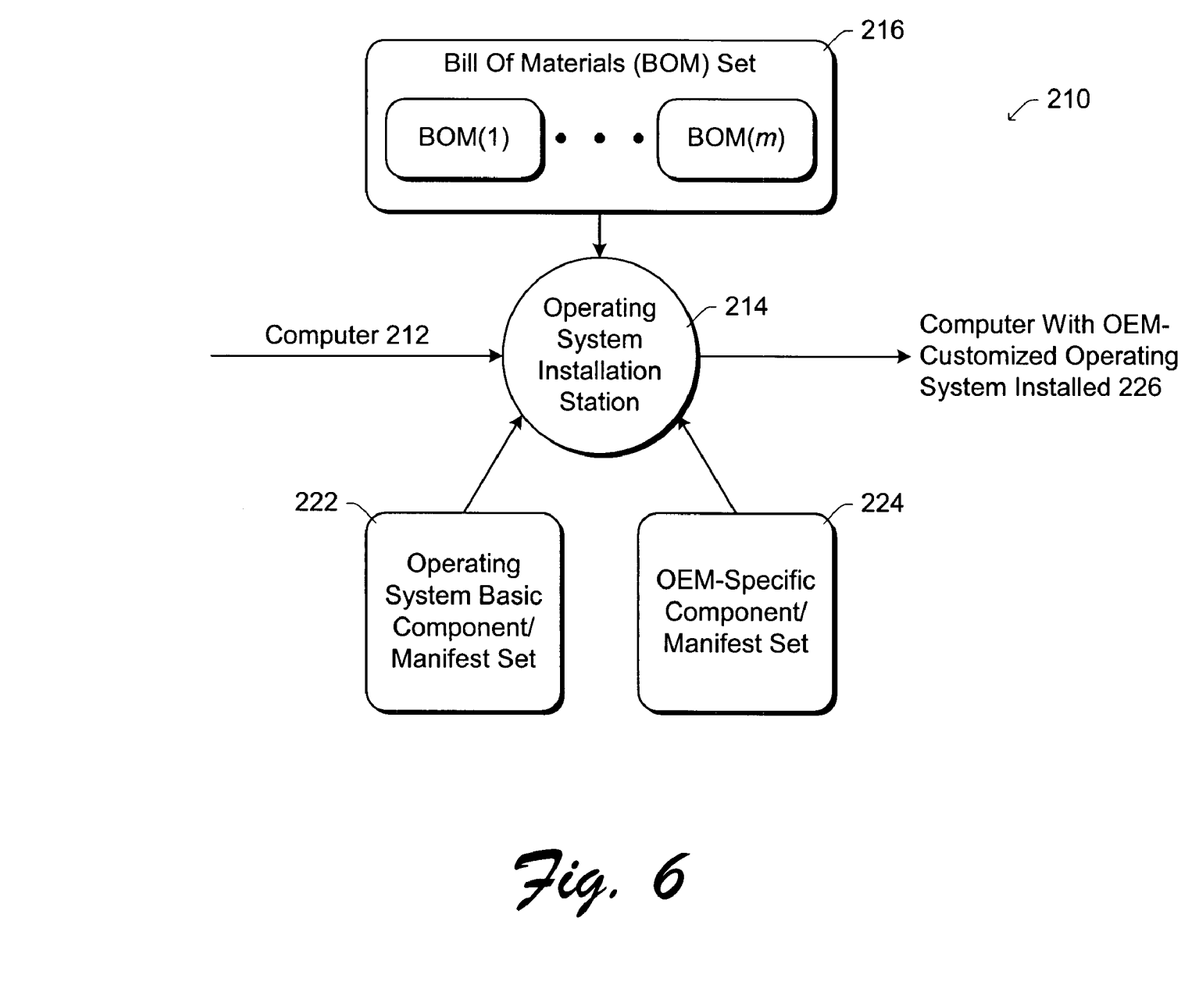
FIG. 6 illustrates an exemplary operating system installation process in accordance with certain embodiments of the invention.

FIG. 6 illustrates an exemplary operating system installation process in accordance with certain embodiments of the invention. In the illustrated example, installation process 210 is performed by an OEM. Alternatively, process 210 can be performed by other entities, such as other manufacturers, distributors, end users, system administrators, etc.

Initially, a computer 212 is received by operating system installation station 214. Computer 212 can be an entire computer system (e.g., housing, processor, memory, mass storage device, display adapter, etc.) or alternatively only a portion of a computer system (e.g., only the mass storage device to which an operating system image is to be installed). At operating system installation station 214, an operating system image is installed on the mass storage device. Operating system installation station 214 can be an automated station, or alternatively various aspects may be performed manually.

Operating system installation station 214 has access to a set of BOMs 216 including multiple (m) BOMs. BOM set 216 includes a BOM for each of the different operating system images that might be installed on a computer 212 by operating system installation station 214. These BOMs can be provided by the manufacturer of the operating system and/or by other entities (e.g., the OEM installing operating system images onto computers). By way of example, an OEM may offer three basic computer configurations: home use, business use, and server use. Each one of these configurations is based on the same operating system but includes different functionality. Additional networking and communications functionality may be included in the server configuration that is not included in either the home or business configurations, and additional games or audio playback functionality may be included in the home configuration that is not included in the business or server configurations. A different BOM is included in BOM set 216 for each of these three configurations, each BOM identifying which components (and thus which functionality) is to be included for each of these configurations. Operating system installation station 214 knows which configuration is to be used for computer 212 and uses the corresponding BOM for installation of the operating system image on computer 212.

Operating system installation station 214 can be aware of the configuration to be used for computer 212 in any of a wide variety of manners. In one implementation, the configuration is manually identified to operating system installation station 214 by an operator. Alternatively, an automatic identification may be used (e.g., by an identifier associated with computer 212, a separate input to station 214, etc.). Alternatively, a particular configuration may be a default configuration which is used unless overridden by another identifier, or the configuration may be determined by time of day (e.g., server systems may only be manufactured during certain hours of the day).

In addition to BOM set 216, operating system installation station 214 also has access to both a basic component and manifest set 222 and an OEM-specific component and manifest set 224. Basic component and manifest set 222 includes multiple operating system components and corresponding manifests available from the operating system manufacturer. The components in set 222 include all of the various functionality that may be installed as part of the operating system, even though different configurations may select different ones of the components.

OEM-specific component and manifest set 224, on the other hand, includes additional components that can be installed by the OEM as part of the operating system image. Various functionality can be customized by the OEM, such as the startup display (e.g., to display the OEM's name and logo), screen savers, backgrounds or themes, software applications (e.g., communications programs, games, etc.). This additionally functionality can be provided by the OEM, or alternatively other manufacturers or distributors.

Each BOM in BOM set 216 identifies one or more components from basic component/manifest set 222 and/or OEM-specific component/manifest set 224 to be installed as the operating system image on computer 212. Operating system installation station 214 accesses the appropriate BOM for the computer 212, and then installs the various components, identified in that BOM, from the sets 222 and 224. The BOM itself is also copied to the computer 212. The computer with the OEM-customized operating system installed 226 is then output by operating system installation station 214.

The operating system installation process 210 is simplified greatly by the componentization of the operating system. OEM-specific functionality can be easily added to a computer by including the appropriate component and corresponding manifest in set 224 and creating a new BOM(s) in BOM set 216.

Furthermore, updates to the operating system (e.g., improved functionality, bug fixes, etc.) can be easily incorporated into the installation process by simply replacing the corresponding components in set 222. Alternatively, an additional update component and manifest set (not shown) may be available to operating system installation station 214 that includes such updates. An update process can then be run by station 214 after installation but prior to output of the customized computer 226.

In the illustrated example, each of the sets 216, 222, and 224 is local to operating system installation station 214. Alternatively, one or more of sets 216, 222, and 224, or one or more of the BOMs in BOM set 216 or components and/or manifests in sets 222 and 224, may be located at a remote location.

Figure 7:
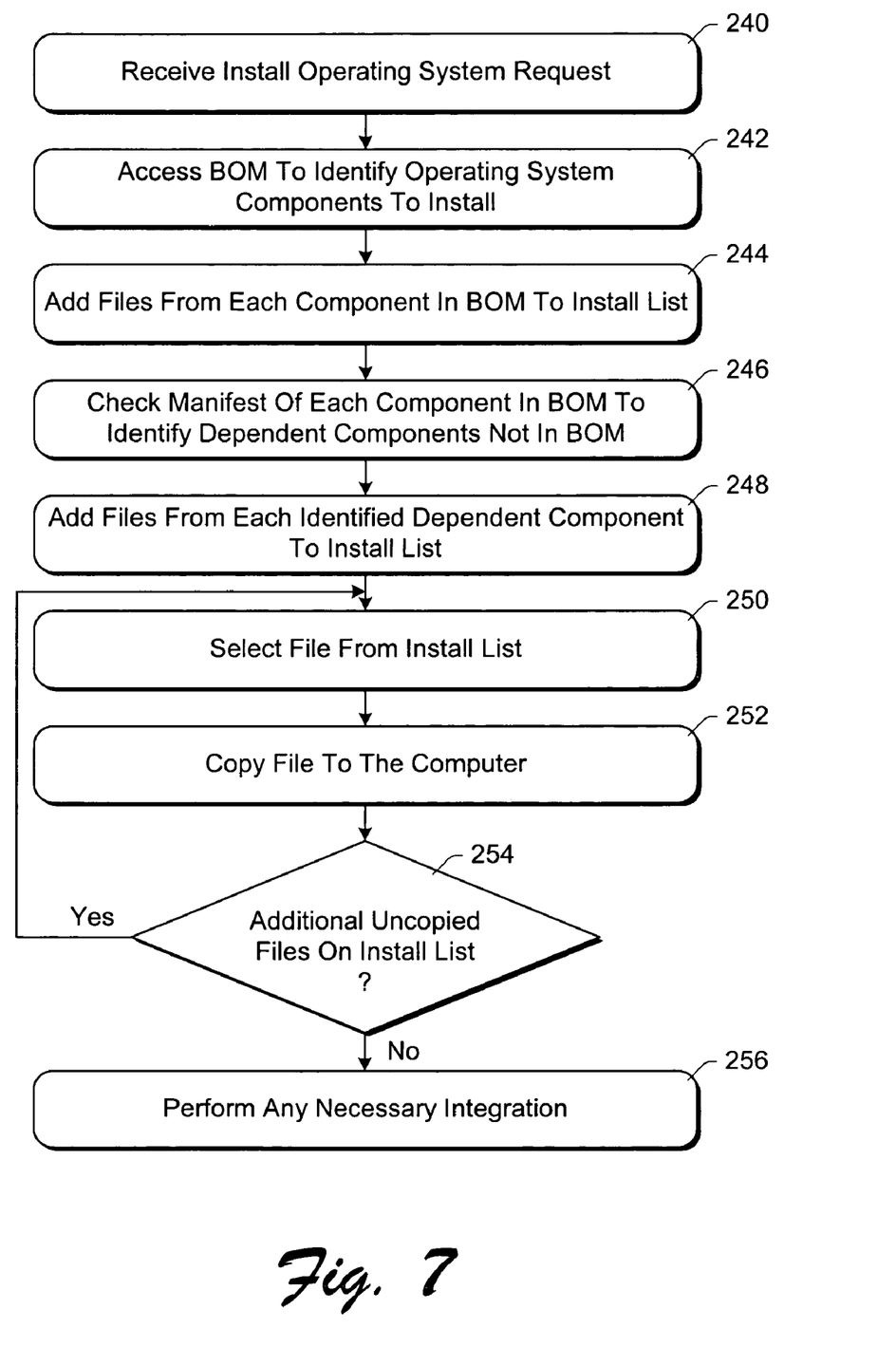
FIG. 7 illustrates an exemplary process for installing an operating system in accordance with certain embodiments of the invention.

FIG. 7 illustrates an exemplary process for installing an operating system in accordance with certain embodiments of the invention. The process of FIG. 7 is implemented by a setup application (e.g., integration engine 140 of FIG. 1) that can be executed on the computer that the operating system is to be installed on or alternatively another computer (e.g., installation station 214 of FIG. 6) coupled to the computer that the operating system is to be installed on. The process of FIG. 7 can be performed in software, hardware, firmware, or a combination thereof.

Initially, a request to install the operating system is received (act 240). In response to this request, the appropriate BOM is accessed to identify which operating system components to install (act 242). An install list is then created and the file names (or other identifiers) for each component in the BOM are added to the install list (act 244).

The manifest of each component in the BOM is then checked to identify whether any dependent components indicated in the manifest are not listed in the BOM (act 246). If any such dependent components are identified, then the file names (or other identifiers) for each component are added to the install list (act 248).

A file is then selected from the install list (act 250), and is copied to the computer (act 252). The file may be available locally from the distribution source (e.g., the CD-ROM or local server being used for installation) or alternatively from a remote location (e.g., a remote server). Regardless of the location of the file, the file is retrieved and copied to the computer in act 252.

A check is then made as to whether there are any additional files on the install list that have not yet been copied to the computer (act 254). If so, then the process returns to act 250 to select another file for copying. Once all files have been copied to the computer, the integration engine 140 integrates the files as necessary (act 256). The manner in which files are integrated can vary by operating system. As used herein, integration refers to the actions taken to coordinate the copied files to function as an operating system when executed. Examples of such integration include decompressing any compressed files, linking together files, creating and/or modifying a system registry, storing information in a component library or fast indexed store, etc. Once the integration is complete, the operating system installation process is finished.

Alternatively, the install list generated in acts 244 and 248 may include the components themselves rather than the files of the components. By way of example, in act 244 identifiers of each component identified in the BOM can be added to the install list.

According to another alternative, an install list is not used. Rather, the installation process may simply access each component in the BOM and copy the corresponding files one by one, as well as any dependent files listed in the corresponding manifests. This process can be continued component by component until all components are installed.

It should be noted that the installation process of a componentized operating system simplifies installation of the operating system on the factory floor (e.g., by the OEM). The files to be installed on a computer can be changed easily by simply modifying the appropriate BOM and making the corresponding components available. By way of example, a last-minute bug fix can be easily incorporated by simply making the component(s) with the new file(s) available and modifying the appropriate BOM to identify the new component(s) rather than the previous component(s).

Figure 8:
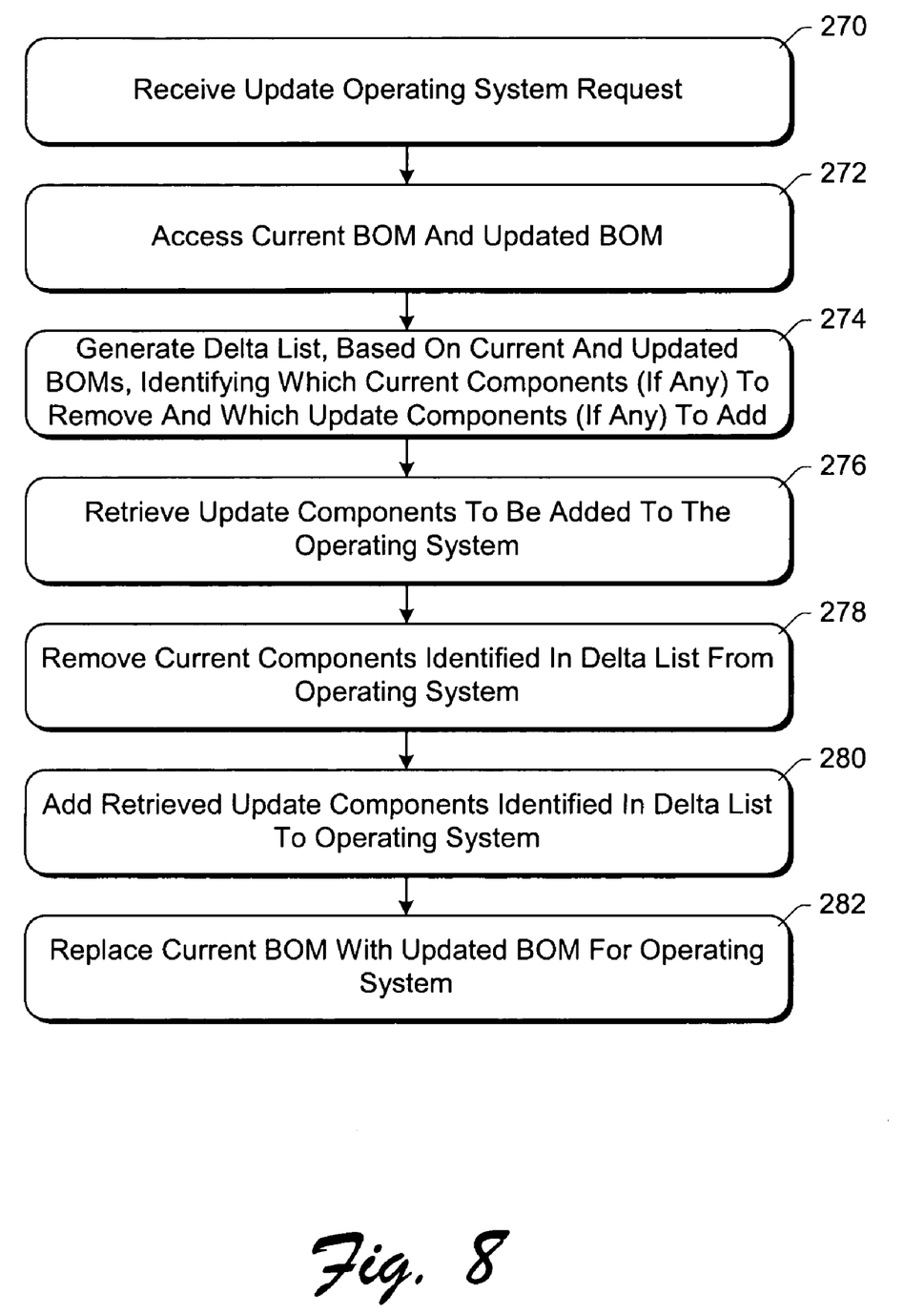
FIG. 8 illustrates an exemplary process for updating an operating system in accordance with certain embodiments of the invention.

FIG. 8 illustrates an exemplary process for updating an operating system in accordance with certain embodiments of the invention. The process of FIG. 8 is implemented by an update application (e.g., integration engine 140 of FIG. 1) that can be executed on the computer that the operating system is to be installed on or alternatively another computer coupled to the computer that the operating system is to be installed on. The update application may be part of the operating system being updated, or alternatively a separate application. The process of FIG. 8 can be performed in software, hardware, firmware, or a combination thereof.

Initially, a request to update or upgrade the operating system is received (act 270). A current BOM (identifying components currently installed as the operating system) is then accessed along with an updated BOM (identifying components that are included in the updated version of the operating system) (act 272). The updated BOM can be obtained from a variety of sources, such as the operating system manufacturer, an OEM, etc.

A delta list is then generated, based on the current BOM and the updated BOM, identifying which components (if any) are to be removed from the operating system image on the computer and which components (if any) are to be added to the operating system image on the computer (act 274). The delta list identifies the differences between the current BOM and the updated BOM.

Any update components which are to be added to the operating system are then retrieved (act 276). These may be retrieved from the same source as the updated BOM, or alternatively another source. Any components identified in the delta list that are to be removed from the operating system are then removed from the operating system (act 278), and any of the retrieved components are added to the operating system (act 280). The current BOM is then replaced with the updated BOM (act 282).

Alternatively, the updated BOM may identify only those components that are to be added to and/or deleted from the operating system as part of the update process rather than identifying components that are included in the updated version of the operating system. In this situation, rather than replacing the current BOM with the updated BOM in act 282, the current BOM is modified to incorporate the changes (additions and/or deletions) indicated by the update BOM.

Figure 9:
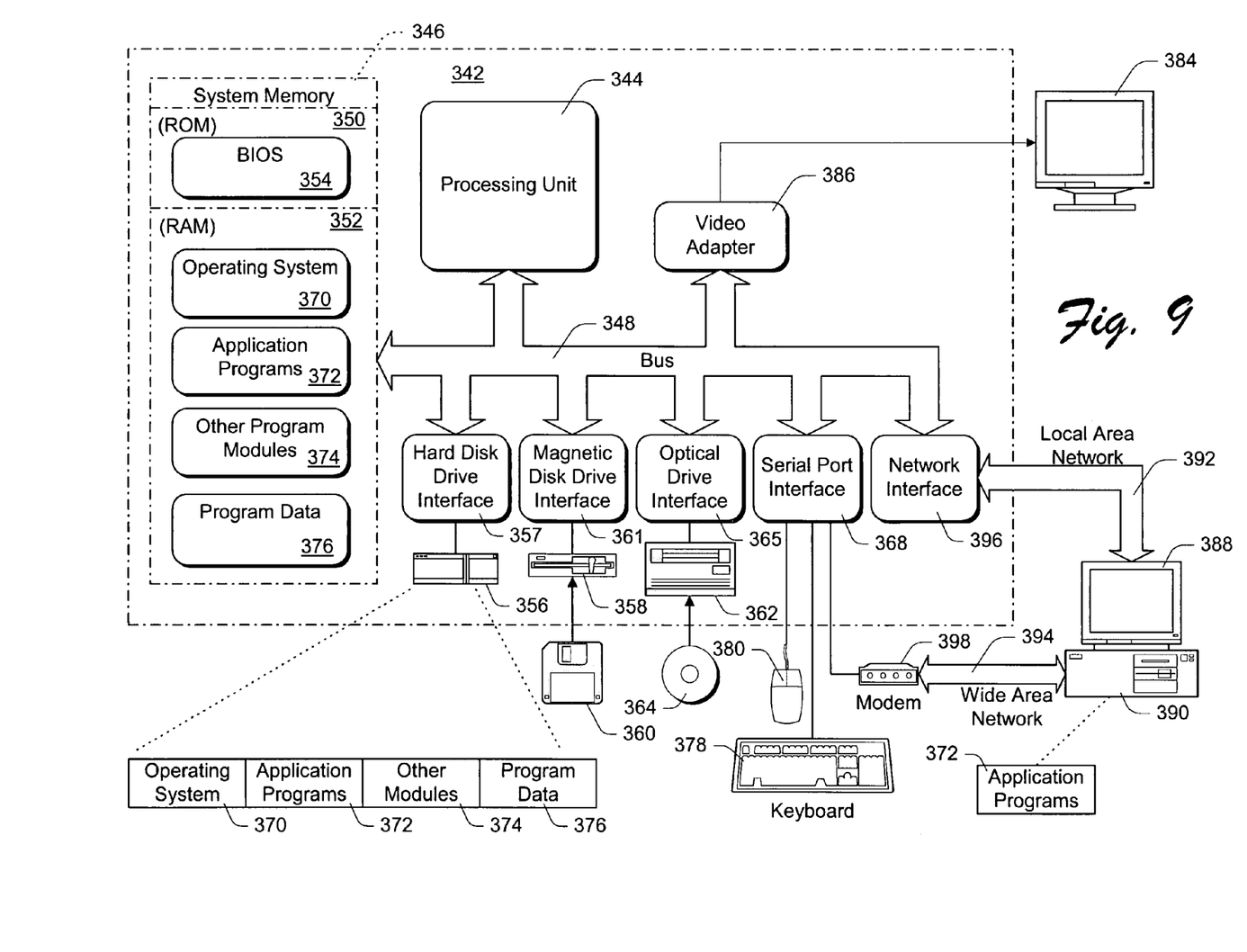
FIG. 9 shows a general example of a computer that can be used in accordance with certain embodiments of the invention.

FIG. 9 shows a general example of a computer 342 that can be used in accordance with certain embodiments of the invention. Computer 342 is shown as an example of a computer that can perform the functions of a computer 100 of FIG. 1 or FIG. 5. Computer 342 includes one or more processors or processing units 344, a system memory 346, and a bus 348 that couples various system components including the system memory 346 to processors 344.

The bus 348 represents one or more of any of several types of bus structures, including a memory bus or memory controller, a peripheral bus, an accelerated graphics port, and a processor or local bus using any of a variety of bus architectures. The system memory includes read only memory (ROM) 350 and random access memory (RAM) 352. A basic input/output system (BIOS) 354, containing the basic routines that help to transfer information between elements within computer 342, such as during start-up, is stored in ROM 350. Computer 342 further includes a hard disk drive 356 for reading from and writing to a hard disk, not shown, connected to bus 348 via a hard disk driver interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. Operating system 370 is a componentized operating system as discussed above (e.g., operating system 102 of FIG. 1). A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 (e.g., a serial port interface) that is coupled to the system bus. A monitor 384 or other type of display device is also connected to the system bus 348 via an interface, such as a video adapter 386. In addition to the monitor, personal computers typically include other peripheral output devices (not shown) such as speakers and printers.

Computer 342 can operate in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 9. The logical connections depicted in FIG. 9 include a local area network (LAN) 392 and a wide area network (WAN) 394. Such networking environments are commonplace in offices, enterprise-wide computer networks, intranets, and the Internet. In the described embodiment of the invention, remote computer 388 executes an Internet Web browser program such as the "Internet Explorer" Web browser manufactured and distributed by Microsoft Corporation of Redmond, Wash.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Generally, the data processors of computer 342 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described above. Furthermore, certain sub-components of the computer may be programmed to perform the functions and acts described above. The invention includes such sub-components when they are programmed as described. In addition, the invention described herein includes data structures, described above, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

Thus, a componentized operating system has been described. The operating system is made up of multiple components that are identified (either explicitly or implicitly) by a bill of materials. This advantageously provides an easy mechanism to identify what components are to be installed for an operating system and/or which components are already installed as an operating system. Additionally, the operating system can be readily updated by simply replacing current components.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer-readable media having stored thereon a computer program that installs an operating system on a computer, wherein the computer program includes computer readable instructions that, when executed by one or more processors of the computer, causes the one or more processors to perform acts including:
   accessing a bill of materials (BOM) to identify a first set of operating system components;
   accessing a higher-level manifest corresponding to an individual component of the first set of components, the higher-level manifest including a sub-component list of any sub-components upon which the individual component depends, a priority order for the individual component relative to other components, and a version indicator for the individual component;
   accessing a lower-level manifest of an individual sub-component, the lower-level manifest including a sub-component list of any hierarchical components upon which the individual sub-component depends, a priority order for the individual sub-component relative to other components, and a version indicator for the individual sub-component;
   updating the higher-level manifest consistent with the sub-component priority order and version indicator in an instance where information of the higher-level manifest is outdated relative to the lower-level manifest;
   updating the BOM based upon the higher-level updated manifest in an instance where information of the BOM is outdated relative to the higher-level manifest; and,
   generating an operating system image based upon the BOM, the higher-level manifest and the lower-level manifest.

2. One or more computer-readable media as recited in claim 1, wherein the accessing a higher-level manifest and accessing a lower-level manifest enable managing individual hierarchical sub-components at a relatively fine level of granularity rather than managing individual components at a coarser level of granularity, effective to allow individual sub-components to be dynamically upgraded.

3. One or more computer-readable media as recited in claim 1, wherein the BOM, the higher-level manifest, and the lower-level manifest are accessed from a common distribution source.

4. One or more computer-readable media as recited in claim 1, wherein the generating comprises updating the operating system image.

5. One or more computer-readable media as recited in claim 4, wherein the computer program, when executed, further causes the one or more processors to perform acts including saving the updated bill of materials on the computer.

6. One or more computer-readable media having stored thereon a computer program that includes computer readable instructions that, when executed by one or more processors of a computer, causes the one or more processors to perform acts including:

receiving an updated version of a file for inclusion in an operating system;

accessing a bill of materials (BOM) to identify a first set of higher-level components of said operating system;

accessing a higher-level manifest corresponding to an individual component of said higher-level components, the higher-level manifest including a lower-level dependent component list of any lower-level components upon which the individual higher-level component depends, a priority order for the individual higher-level component relative to other components, and a version indicator for the individual higher-level component;

identifying a prior version of the file in a lower-level manifest corresponding to one of the lower-level dependent components,     adding the updated version of the file to the one of the lower-level dependent components, and updating the corresponding lower-level manifest;

updating the higher-level manifest in an instance where the higher-level manifest contains outdated version information; and,     updating the BOM in an instance where the BOM contains outdated information regarding the higher-level manifest.

7. One or more computer-readable media as recited in claim 6, wherein the bill of materials is stored on the computer.

* * * * *